(12) United States Patent
Deutscher et al.

(10) Patent No.: US 7,520,180 B2
(45) Date of Patent: Apr. 21, 2009

(54) METHOD AND APPARATUS FOR THE ULTRASONIC MEASUREMENT OF THE FLOW RATE OF FLOWABLE MEDIA

(75) Inventors: Martin Deutscher, Freiburg (DE); Thomas Will, Oberrotweil (DE)

(73) Assignee: MIB GmbH Messtechnik und Industrieberatung, Ihringen (DE)

( * ) Notice: Subject to any disclaimer, the term of this patent is extended or adjusted under 35 U.S.C. 154(b) by 0 days.

(21) Appl. No.: 12/091,193

(22) PCT Filed: Oct. 19, 2006

(86) PCT No.: PCT/EP2006/010111
§ 371 (c)(1),
(2), (4) Date: Apr. 23, 2008

(87) PCT Pub. No.: WO2007/048541
PCT Pub. Date: May 3, 2007

(65) Prior Publication Data
US 2008/0223147 A1    Sep. 18, 2008

(30) Foreign Application Priority Data
Oct. 28, 2005    (DE) ................ 10 2005 051 669

(51) Int. Cl.
*G01F 1/66* (2006.01)
(52) U.S. Cl. .................................................. 73/861.27
(58) Field of Classification Search ............. 73/861.29, 73/861.27, 861.22, 861.25, 861.26
See application file for complete search history.

(56) References Cited
U.S. PATENT DOCUMENTS
6,178,827 B1 * 1/2001 Feller ..................... 73/861.27
6,370,963 B1 * 4/2002 Feller ..................... 73/861.29
6,422,093 B2 * 7/2002 Feller ..................... 73/861.27

(Continued)

FOREIGN PATENT DOCUMENTS
CH          604133         8/1978

(Continued)

*Primary Examiner*—Jewel Thompson
(74) *Attorney, Agent, or Firm*—Volpe and Koenig, P.C.

(57) ABSTRACT

A method for operating a measuring apparatus (1) for determining the flow rate of a flowable medium through a measuring section (3) is provided, wherein the measuring apparatus (1) has, as sensors, two ultrasonic transceivers (4), which are arranged spaced apart from one another, for the purpose of ultrasonic testing of the measuring section (3) in and counter to the flow direction and for the purpose of picking up signals and is operated with an ultrasonic phase difference method. The flow rate is determined at east by the following method steps: the first of the sensors subjects the measuring section to ultrasonic testing in a flow direction and the signal is received by the second sensor, the signal is amplified and subjected to A/D conversion, a threshold value is formed, the associated phase angle H is determined and stored, the second of the sensors subjects the measuring section to ultrasonic testing against the flow direction and the signal is received by the first sensor, the signal is amplified and subjected to A/D conversion, a threshold value is formed, the associated phase angle R is determined and stored, the difference between the phase angles, which depends on the direction of flow, id formed, and the phase difference value is corrected using a factor that depends on diameter.

16 Claims, 5 Drawing Sheets

U.S. PATENT DOCUMENTS 6,575,044 B1 *   6/2003   Feller ..................... 73/861.27
7,093,502 B2 *   8/2006   Kupnik et al. ............ 73/861.29

FOREIGN PATENT DOCUMENTS

| | | |
|---|---|---|
| DE | 2131847 | 1/1973 |
| DE | 3734635 | 5/1988 |
| DE | 3823177 | 1/1990 |
| DE | 3843678 | 11/1991 |
| DE | 19530054 | 2/1997 |
| DE | 19934212 | 2/2000 |
| DE | 19841154 | 11/2002 |
| EP | 0262461 | 4/1980 |
| EP | 0762086 | 3/1997 |
| EP | 1498700 | 1/2005 |

* cited by examiner

METHOD AND APPARATUS FOR THE ULTRASONIC MEASUREMENT OF THE FLOW RATE OF FLOWABLE MEDIA

BACKGROUND

The invention relates to a method for operating a measuring apparatus for determining the flow rate of flowable media through a measuring section, wherein the measuring apparatus operates with an ultrasonic phase difference method and has as sensors at least two ultrasonic transceivers, which are arranged at a distance from one another to expose the measuring section to sonic waves in and against the direction of flow and to receive signals. Furthermore the invention also relates to a measuring device to determine the flow rate of flowable media through a measuring section, for example in the above-mentioned method.

The determination of the flow rate of flowable or fluid media can occur via different methods, one of which represents measuring via ultrasound, known per se. Using the known ultrasonic measurement method, e.g., the sing around method (sequential pulse frequency method) continuous flow rates can be measured well. However, here a relatively long measuring period is necessary, so that the use of such methods is not recommended for rapidly changing flow rates. Direct time measurements with transit time techniques are rather unsuitable under such conditions, because a value for the flow rate can only be calculated from the spread of the sound delay including a couple of measurement cycles.

In addition to the known methods already mentioned, so-called ultrasonic phase difference methods to determine the flow rate of the medium through the measuring section are also known from CH 604 133 or DE 37 34 635 A1, for example. The methods suggested here have the disadvantage, though, that one the one hand the measurements are disturbed by a multitude of analog components, the receiver signals can mutually influence each other, and the direction of flow is not known, on the other hand, a high circuit expenses must be invested to shift the phase of measuring signals and a subsequent synchronization.

SUMMARY

Therefore the object of the present invention is to provide a method for measuring the flow rate, which allows an undisturbed, fast, high-resolution determination of the flow rate with a reduced wiring expense.

This object is attained in a method of the type mentioned at the outset, in which the sensors each are alternately operated as transmitters and receivers, in which the sensors are operated with an alternating current of an adjustable, constant frequency, with the transmission period of the transmitting sensor being longer than the receiving period of the receiving sensor and the flow rate being determined at least by the following processing steps:
- exposing the measuring section to sonic waves by one of the sensors in the direction of flow and receiving the signal by the other sensor,
- amplification of the signal, A/D-conversion, formation of threshold values, determination and storage of the respective phase position H,
- exposing the measuring section to sonic waves by the other of the sensors against the direction of flow and receiving the signal by the first sensor,
- amplification of the signal, A/D-conversion, formation of threshold values, determination and storage the respective phase position R,
- forming the difference of the phase values depending on the direction of flow,
- correcting the phase difference value with a factor depending on the diameter.

In the method according to the invention, a measuring device is therefore operated with an ultrasonic phase difference method to measure the flow rate. Here, at least two ultrasonic-transceivers are arranged as sensors at opposite sides of the measuring section to be exposed to sonic waves and advantageously operated alternating as a transmitter and receiver. The medium to be measured is here radiated once essentially in the direction of flow and then essentially against the direction of flow. Dependent on the flow speed, differently sized phase shifts of the sonic signals result. Due to the fact that the measurement occurs separately for both directions of flow advantageously an analog part, comprising perhaps an amplifier and a threshold value switch must be set up only once, which reduces the inaccuracy of parts influencing the measuring, for the rest the two receiver signals do not interfere each other.

In the transmitting operation the respective transmitter sends several packages of ultrasonic oscillations, for example two, four, preferably six, eight, or more packages with a certain number of pulses each, for example 32, 64, or 128 pulses, which are received by the other sensor operating in the receiver mode, after having passed the fluid to be measured. Here, the sensors are operated with a square wave voltage, adjustable but with a constant frequency, for example 1 MHz. By the determined measurement frequency the transmitted fast pulses can be measured in a reproducible manner, which would not be the case in a variable scanning frequency.

Here, an overall measurement, comprising a measurement in the nominal direction and a measurement against the nominal direction lasts approximately several milliseconds, for example 4.096 ms for six packages of 64 pulses each.

Interferences of the measurement process by initial and final transient effects or the shift of the package by temperature changes and thus the resultant change of the speed of sound in a medium to be measured can beneficially be gated such that in the method according to the invention the transmitted package has a longer duration than the opening time of the receiver.

The flow velocity v to be determined results from $$v = c^2 \cdot \frac{\varphi_- - \varphi_+}{2 \cdot L \cdot 2 \cdot \pi \cdot f},$$

with $\varphi_+$ representing the phase shift in the direction of flow, $\varphi_-$ the phase shift against the direction of flow, c the speed of sound velocity, L the length of the measuring section, and f the frequency of the ultrasound.

Advantageously, in a preferred embodiment of the method, the phase values for each sonic direction are yielded from the phase difference between a reference signal and the respective receiver signal of the sonic direction by way of measuring. The use of a reference signal and the processing of two phase values connected thereto also allow an identification of the flow direction of the medium. The reference signal and the receiver signal of the respective sonic direction are connected to the inputs of a phase detector circuit and control its output. At the output of these circuits pulses are created, with their length depending on the phase difference between the reference signal and the receiver signal. Therefore, with this method real measurements are created at all times, because each measurement begins at zero and the previous measurement is not included in the result of the measurement, which is thus determined independently.

The phase detector circuit is here preferably provided with a phase comparator (PD-member) known as phase comparator type 3 having a slope-dependent and/or slope-triggered connection, which usually is realized by a Flip-Flop switch. Due to this slope triggering of the phase detector circuit the measuring range is also expanded in reference to the use, e.g., of an AND-member or XOR-member, because a maximum phase difference of 360° is possible. By the circuit mentioned, at the output of the phase detector circuit pulses are yielded, with their length depending on the phase shift of the two receiver signals. These pulses showing the phase shift are integrated within the receiving window of the receiving sensor.

In another way of executing the method the reference signal is beneficially time-shifted in certain steps. This way, for example, a temperature-related shift of the two receiver signals can be followed. This allows to ensure that the entire measuring range is available for the measurements at all times. When the medium to be measured is not flowing, here the receiver signals are ideally phase shifted by a base shift of approx. 90-180° compared to the reference signal, in this case by the same amount, of course. This basic shift is irrelevant for the calculation of flow, however, because only the difference of the reference signal to the receiver signal is included in the calculation of the flow, this results in advantages for the operation of the phase detector circuit. The deliberate phase shift is automatically eliminated by the method, because this shift is equally effective in both directions of the measurements.

The evaluation of the output signals of the phase detector circuit can occur beneficially in two different types in one way of performing the method according to the invention, namely by a digital counting of the signal or an analog integration.

In the first way of execution, a digital counting of the output signal of the phase detector circuit occurs with a counting clock, which is considerably higher than the ultrasonic frequency. The respective counter is therefore operated with a high frequency, with the meter being only released during the output pulse of the phase detector circuit. This way numbers are yielded directly proportional to the phase shift. During the time the time-variant output signal of the phase detector circuit is logically on "high", the counter, operating with a high-frequency clock cycle, is switched on and delivers numbers depending on the phase shift. Again using the example with six pulse packages of 64 pulses per measurement, approximately 40 output signals of the phase detector circuit are evaluated for each pulse package, the counter therefore measures approx. 240 signals for six pulse packages, which results in a respectively higher resolution of the measurement.

When executing the method with an analog integration beneficially a capacitor is charged by the pulses of the phase detector circuit. Here, first the necessary connection of the signals is created by the phase detector circuit and a so-called PWM-signal is created for further processing, with its pulse width being proportional to the phase shift. Then, during the measuring period a counted, constant pulse number of this PWM-signal is connected to an analog integrating circuit, resulting in a charge voltage proportional to the pulse width. After finishing the integration process the capacitor can be discharged by a constant current and/or a signal of constant pulsing (reference clock pulse), with the duration of the discharge process and/or the number of reference clock pulse again being proportional to the phase shift and can be measured by a counter. From the fluid velocity determined with the help of the phase shift, in a known cross-section of the measuring pipe, the volume flown through can be determined.

In contrast to known methods, which for example can measure a continuous flow, the method according to the invention is a very fast one with a number of 250 real measurements per second, for example allowing to directly follow the flow progression of the medium to be measured. This way, the method is also suitable for short-term occurring fill and dosing processes, such as the sometimes extreme conveyance characteristics of piston-diaphragm pumps can be determined. Furthermore, the multiple measuring of the phase values in the receiver window and the subsequent integration also ensure low susceptance to interference, because it is unnecessary to find the right pulse from the receiver signal. In case that were necessary, a phase jump would automatically lead to faulty measurements. In the method according to the invention, a phase jump within the receiver signal is irrelevant, though, because in this case simply a shifting occurs by one pulse.

An exchange of the medium itself or a change of its temperature and the sonic velocity connected thereto is able to falsify the measurement. By changing the sonic velocity, a signal transmitted by one of the sensors sooner or later reaches the receiver, resulting in the phase difference changing in reference to the previous status. Therefore it is advantageous that in a further development of the method, the sonic velocity is also measured by at least one sonic time of flight measurement, so that a respective correction and/or compensation for temperature and/or sonic time of flight can be provided.

In order to maintain the sonic time of flight during a measuring process, a reproducible point in a pulse package must be found, which first requires knowing the oscillation behavior of the circuit as well as the height of the individual amplitudes. This is achieved in that first a short pulse package is transmitted via a transmitter, for example two pulses only, with the oscillation behavior being deduced from the height of the receiver signals. For a reproducible measurement of the sonic time of flight further a signal slope as steep as possible is necessary, resulting in the above-mentioned receiver signal to be amplified as much as possible, with the phase measurement remaining uninfluenced by this overamplification of the receiver signal. Therefore, it is advantageous when during the execution of the method the following steps are also processed, including the sonic time of flight measurement:

transmitting a short pulse
 measuring the pulse height for the sonic time of flight measurement,
 determining the trigger threshold values for the sonic time of flight measurement,
 overdriving the receiver signal without interfering the phase measurement,
 measuring the time of flight at different trigger threshold values,
 switching off the overamplifying amplifier,
 determining the sonic time of flight from the various measured values.

Here, it is further advantageous to use several time of flight values and the pulse height to determine the sonic time of flight, because here an unambiguous determination can be made; which waves were hit by the trigger threshold, for example the first and the second or the second and the third, resulting in a sufficiently precise determination of the sonic time of flight. The determined sonic time of flight leads to determine a correction factor, which in turn is included in the calculation of the flow rate from the phase difference values.

In order for the respective measurement processes not to mutually interfere with each other it is beneficial when performing a further development of the method to determine the phase difference values and the sonic time of flight measurement independent from each other, which means that the transmitting process for measuring the sonic time of flight occurs outside the receiving window of the phase measurement and the measurement of the sonic time of flight in turn occurs not during the transmitting period for the phase measurement.

This sonic time of flight value can also be used to compensate temperature changes. The pulse package of two pulses, for example, is here additionally transmitted to the pulse packages of the phase measurement, namely such that no interference occurs between the phase measurement and the sonic time of flight measurement. This again means that the transmission of the two pulses mentioned occurs outside the receiver window of the phase measurement and the sonic time of flight measurement occurs outside the transmitting time of the phase measurement. Using such a sonic time of flight measurement even rapid changes in temperature can be better followed, than for example by measuring the temperature via resistors, which themselves show and/or form heat capacities, because the medium is measured directly. A subsequently calculated value compensation is therefore advantageous because the measurement arrangement requires no changes, thus no detuning of components is necessary, for example a frequency generator or a constant current source.

The execution of at least the processing steps of summation, compensation, and correction of the phase difference values occur here beneficially supported by a microprocessor.

A flow rate can be yielded with the method described, for example as follows: in and against the direction of flow six packages each are transmitted with a certain number of pulses by the respective transmitter received by the respective receiver, amplified, A/D-converted, and compared to the reference signal; then the difference is calculated from the phase values depending on the direction of flow. The values of four of these cycles are then added, the summarized phase difference value is then compensated for time of flight, and provided with a factor depending on the diameter. This method according to the invention to determine the flow rate is suitable here for measurements in both directions of flow, additionally negative flow can be measured and offsets based on production tolerances can be eliminated from the calculation, without requiring any phase shift of the measurement signal. The asynchronous phase detector circuit used operates here fast enough, even without a very high-frequency clock signal. In the method described measurements are possible with high temporal resolution so that even fast processes for dosing or pumping processes can be detected. Here, integrating a multitude of measurements in each cycle very rapidly creates a measurement with a high resolution of the measuring range.

With regard to determining the flow rate of flowable media through a measuring section, the invention includes at least two ultrasonic transceivers (4) that are arranged at the measuring section, spaced apart in reference to each other, as sensors exposing the measuring section to sonic waves in and against the direction of flow and that the sensors alternately operate as transmitters and receivers with an alternating current, operable with an adjustable, constant frequency, and with the receiving sensor having a shorter receiving period than the transmitting period of the transmitting sensor such that the apparatus is provided with at least one device, amplifying receiver signals, forming a threshold value, and/or determining the phasing of the receiver signal, and storing, and that the measuring device being provided with a phase detector circuit and an evaluation device, supported by microprocessors, to correct the different phase values. Here, the advantages according to the invention develop already explained in the description.

BRIEF DESCRIPTION OF THE DRAWINGS

In the following the invention shall be explained in greater detail using the figures of the drawing. Shown in a partially rather schematic illustration are.

DETAILED DESCRIPTION OF THE PREFERRED EMBODIMENTS

Figure 1:
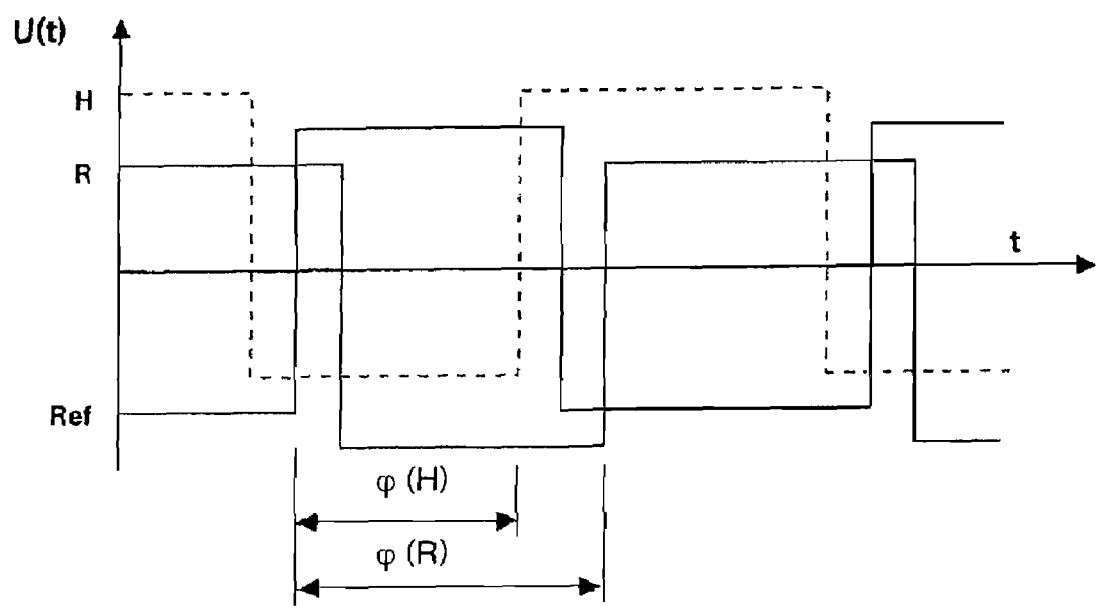
FIG. 1 a diagram with the temporal progression of the receiver signal in and against the nominal direction and their phase position compared to a reference signal.

In FIG. 1 the temporal progression of the receiver signals H and R of a receiver signal of a fluid to be measured in the direction of flow is shown, running towards (H) and against (R) the direction of flow. Here, the phase status of the two signals and/or their phase difference is discernible, which is measured for each sonic direction, compared to the reference signal Ref, which is measured for each sonic direction. This results from the shift of the rising slope of the respective square signal and is marked for both signals with $\phi(H)$ and/or $\phi(R)$.

Figure 2:
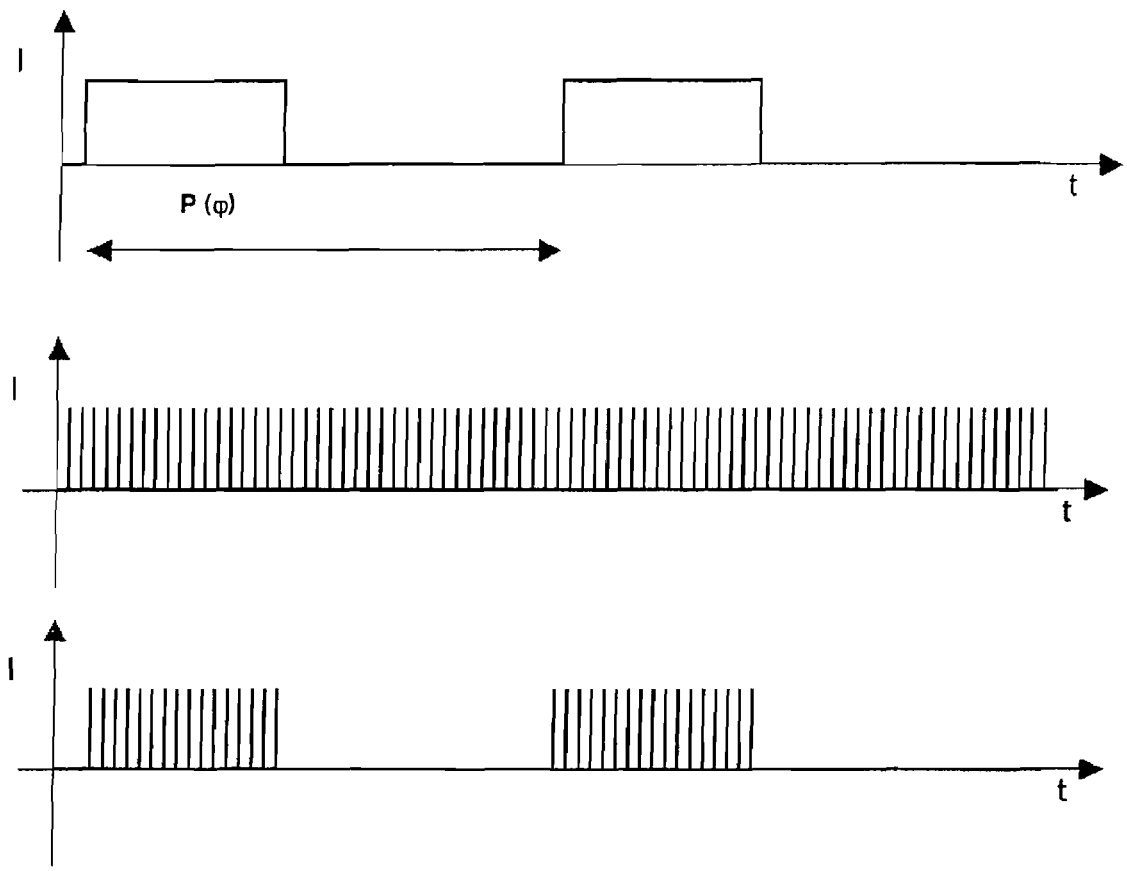
FIG. 2 diagrams with the phase-dependent pulse widths of the output pulses of the phase detector circuit, the high-frequency measuring clock counting these pulses, and the actually counted measuring pulse.

The output of the phase detector circuit is set with the rising slope of the reference signal Ref, in the method according to the invention, and with the rising slope of the receiver signal (depending on the measuring direction H or R) reset again. When using a slope-triggered PD-member in the phase detector circuit pulses are yielded at their output, with their length depending on the phase shift of the signals. These phase dependent pulse widths $P(\phi)$ are schematically displayed in the upper diagram of FIG. 2 at a time axis and are integrated during the receiver window of the receiving sensor. Here, the central diagram of FIG. 2 shows the counting of the output signals of the phase detector circuit with a high-frequency measuring clock, thus a meter clock distinctly higher than the ultrasonic frequency. During the time, the time-variant output signal of the phase detector circuit is logically set to "high", the counter operating with the high-frequency meter clock is switched on, so that by the counting indicated in the lowermost diagram of FIG. 2, a counter value is yielded depending on the phase shift.

Figure 3:
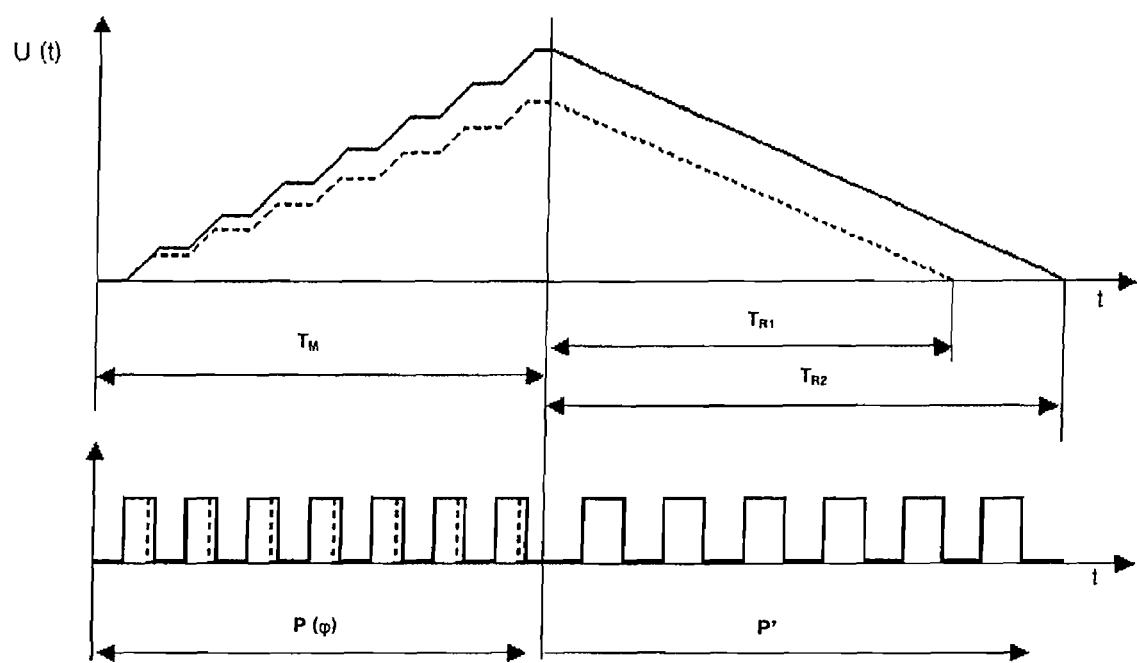
FIG. 3 a diagram with the voltage integrated from the phase-dependent pulse widths, during the subsequent reference periods counted subsequently by constant pulse widths of a reference clock.

In FIG. 3 it is shown schematically how the phase-dependent output pulses of the phase detector circuit $P(\phi)$ are integrated analog such that during the measuring period $T_M$ a capacitor is charged by the pulses. After ending the integration process, the capacitor is then discharged via a reference current, with the duration of discharge measurable by a counter being proportional to the phase shift of the signals. At the output of the phase comparison circuit there is a PWM-signal, at which the pulse widths P(φ) are proportional to the phase shift. While during the constant measurement period $T_M$, a counted constant pulse number of this PWM-signal is connected to the analog integrating circuit, which leads to a charge voltage U developing proportional to the pulse width and thus to the phase position. Subsequently the capacitor is discharged with a constant current. The discharge period depends on the voltage at the capacitor and thus on the phase difference between the receiver signal and the reference signal. During the discharge process counter pulses are created, which are added in a counter and are provided to the microprocessor for further processing. The number of these meter clocks and/or pulses is now once more proportional to the phase shift.

By both methods shown in FIGS. 2 and 3, using the phase shift, the fluid velocity can be determined and the flow rate volume can be concluded for a known cross-section of the measurement pipe.

Figure 4:
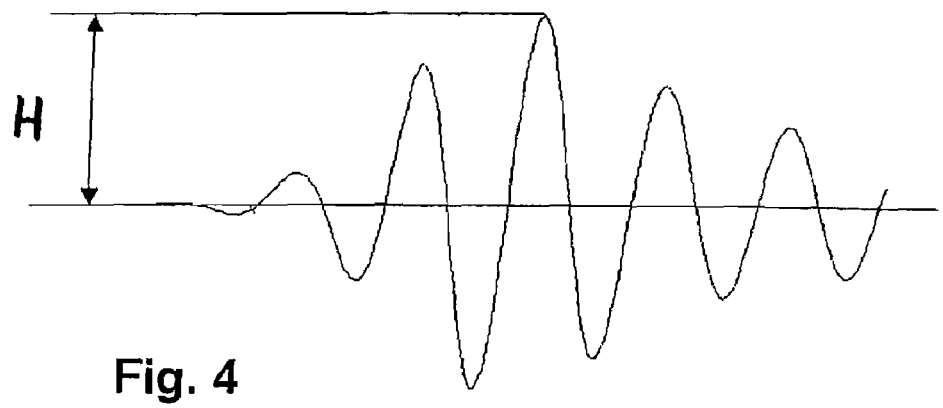
FIG. 4 a diagram with a receiver signal in a normally amplified state.
Figure 5:
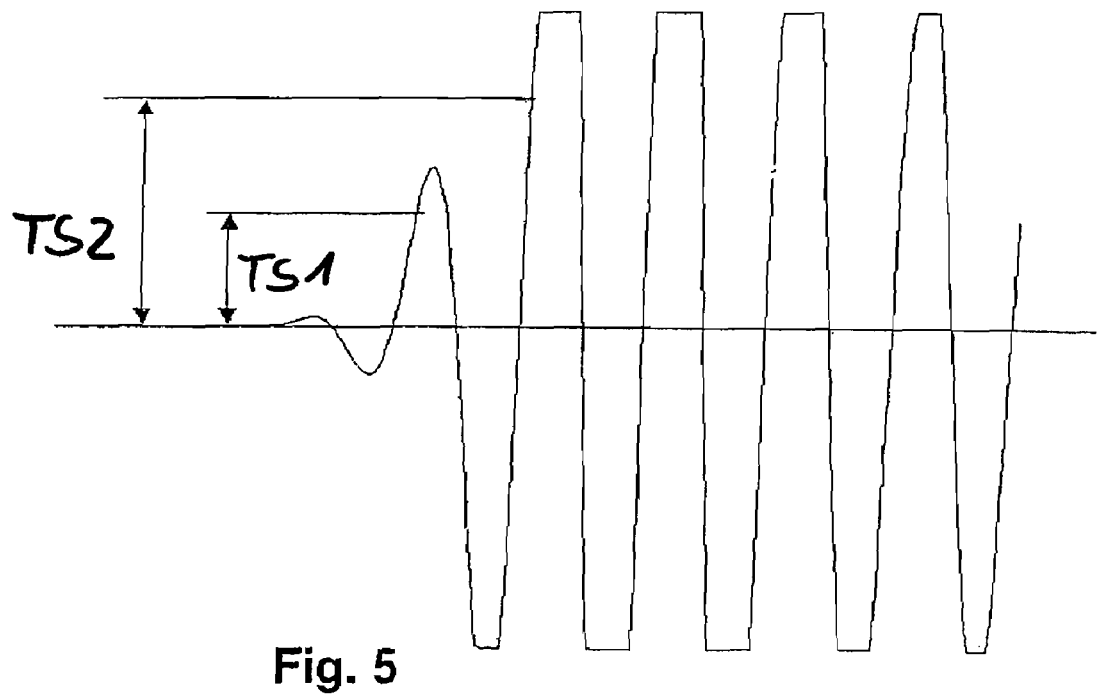
FIG. 5 a diagram of a receiver signal in the overdriven amplified state with the trigger threshold for the sonic time of flight measurement.

FIG. 4 shows a pulse as a receiver signal in a normally amplified state. The pulse height H of this signal can be determined from the amplitudes of the normally amplified receiver signal. FIG. 5 shows the receiver signal in the overdriven state with the trigger threshold values TS1 and TS2 for the sonic time of flight measurement. For the signal shown in FIG. 5 the trigger threshold values TS1 and TS2 are adjusted such that the trigger threshold TS1 impinges the first amplitude of the signal and the trigger threshold TS2 the second amplitude of the signal. However, other settings of the trigger thresholds and/or signal amplitudes are also possible, e.g., such that the first amplitude is so low that both thresholds cross the second amplitude or that the first amplitude is so high that it cross both thresholds. Furthermore, another situation is possible that the receiver signal is so weak that the trigger threshold TS1 first crosses the second amplitude and the trigger threshold TS2 then the third amplitude. Which of these situations is provided can be determined by the sonic time of flight measurement, using the determination of the pulse height, that had occurred previously and which is shown in FIG. 4.

Figure 6:
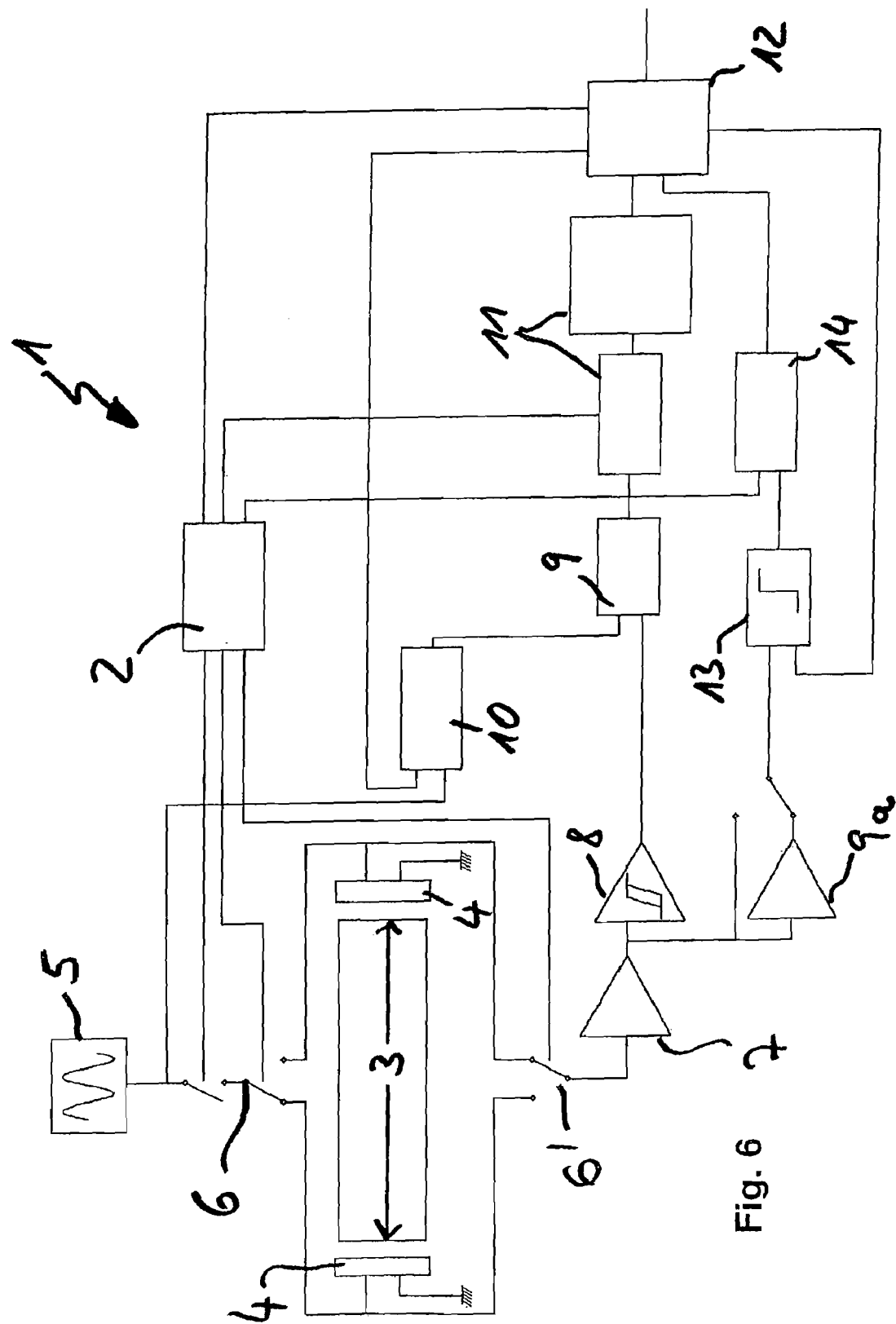
FIG. 6 a block diagram of a measuring device to control the measuring process according to the method of the invention.

FIG. 6 shows the block diagram of a measurement device, in its entirety marked 1, which via a control element 2 controls the measurement process of an ultrasonic measurement at a measuring section 3, at which ultrasonic transceivers 4 are arranged as sensors. First a frequency generator 5 is controlled here, creating the clock signal for the ultrasonic transceiver 4, by which any closing of the switch 6 is decided by the control, and which of the ultrasonic transceivers shall emit the pulse package created by the frequency generator 5. According to this selected measuring direction the receiver signal is fed via the switch 6' to the amplifier 7. The amplifier 7 forwards the signal to the threshold value switch 8 of the phase measurement and the switchable amplifier 9a of the sonic time of flight measurement. The output signal of the threshold value switch 8 travels to the phase detector 9, where it is compared to the reference signal, which in turn is created from the signal of the frequency generator and has intentionally be shifted in its phase by the switchable phase shifter 10. The output signal of the phase detector switch is forwarded to a meter level 11 with a measuring gate and an integrating circuit. The result created in the measuring device is then provided to the microprocessor 12 for further analysis and/or use.

The second path of the amplified signal after the amplifier 7, already mentioned, runs to the switchable overdriving amplifier 9a, first amplifying with the factor 1 to measure the pulse height, leaving the signal unchanged. In order to measure the pulse height the trigger signal is reduced at the trigger 13 until the meter value is within a target window, with the pulse height thus being determined. Subsequently the trigger threshold values are set and then the overdriving amplifier is switched on, by which the sonic time of flight is measured. The value of the sonic time of flight measurement connected to the counter 14 is then in turn forwarded to the microprocessor 12 for further processing.

The above-stated invention therefore relates to a method to operate a measuring device 1 to determine the flow rate of flowable media through a measuring section 3, with the measuring device 1 being provided with at least two ultrasonic transceivers 4 as sensors for sending signals in and against the direction of flow and for accepting signals, and which are operated with an ultrasonic phase difference method, which method is characterized in that the sensors each alternately operate as transmitters and receivers, that the sensors are operated with an alternating current of an adjustable, constant frequency, with the transmitting period of the transmitter being longer than the receiving period of the receiver and the flow rate being determined by the following processing steps:
   exposing the measuring sector 3 to sonic waves by one of the sensors in the direction of flow and receiving the signal by the other sensor,
   amplifying the signal, forming threshold values, determining and storing a respective phase position H,
   exposing the measuring sector 3 to sonic waves by the other sensor against the direction of flow and receiving the signal by the first sensor,
   amplifying the signal, forming threshold values, determining and storing the respective phase position R,
   forming the difference of the phase values depending on the direction of flow,
   correcting the phase difference value by a factor depending on the diameter.

The invention claimed is:

1. A method to operate a measuring apparatus (1) to determine a flow rate of flowable media through a measuring sector (3), with the measuring apparatus (1) comprising at least two ultrasonic transceivers (4) as sensors to expose the measuring sector (3) to sonic waves in and against a direction of flow and to detect signals, and which is operated via an ultrasonic phase difference method, the sensors are each alternately operated as transmitters and receivers, the sensors are operated with an adjustable alternating current having a constant frequency, with transmitting periods of the transmitter being longer than a receiving period of the receiver, and the flow rate being determined by at least the following steps:
   exposing the measuring sector (3) to sonic waves by one of the sensors in the direction of flow and receiving the signal by the other sensor,
   amplifying the signal, A/D-conversion, forming threshold values, determining and storing a respective phase position H,
   exposing the measuring sector (3) to sonic waves by the other sensor against the direction of flow and receiving the signal by the first sensor,
   amplifying the signal, A/D-conversion, forming threshold values, determining and storing the respective phase position R,
   forming a difference of the phase values depending on the direction of flow,
   correcting the phase difference value with a factor depending on the diameter.

2. A method according to claim 1, wherein the processing steps including the formation of the difference of the phase values are processed several times and the phase difference values are added.

3. A method according to claim 1, wherein at least two packages with several pulses are created as ultrasonic oscillations by the respectively transmitting sensor.

4. A method according to claim 1, wherein the phase values for each sonic direction are taken from a phase difference between a reference signal and the respective receiver signal of the sonic direction.

5. A method according to claim 4, wherein the signals of the reference signal and the receiver signal control an output of a phase detector circuit (9).

6. A method according to claim 5, wherein the phase detector circuit (9) is slope-triggered.

7. A method according to claim 1, wherein the reference signal can be time-shifted to follow a shift of the receiver signal.

8. A method according to claim 1, wherein output signals of the phase detector circuit are digitally counted or analog integrated.

9. A method according to claim 8, wherein numbers are created by a digital counting element proportional to the phase difference.

10. A method according to claim 8, wherein a capacitor is charged by the output signal.

11. A method according to claim 1, wherein during operation a determination of sonic speed occurs by at least one sonic time of flight measurement.

12. A method according to claim 11, wherein at least the following steps are performed during the sonic time of flight measurement:
   transmitting a short pulse
   measuring a pulse height for the sonic time of flight measurement,
   determining trigger threshold values (TS1, TS2) for the sonic time of flight measurement,
   overdriving a receiver signal without interfering the phase measurement,
   measuring a time of flight at different trigger limits (TS1, TS2)
   switching off an overamplifying amplifier,
   determining the sonic time of flight from the various measurements.

13. A method according to claim 1, wherein the phase difference value is compensated for the sonic time of flight.

14. A method according to claim 1, wherein the determination of the phase difference value and the sonic time of flight measurement occur independent from each other.

15. A method according to claim 1, wherein at least the processing step of the addition, compensation, and correction of phase difference values is performed, supported by microprocessors.

16. A measuring apparatus (1) to determine the flow rate of flowable media through a measuring sector (3), comprising at least two ultrasonic transceivers (4) arranged at a distance from each other as sensors at the measuring sector to expose the measuring sector to sonic waves in and against a direction of flow, the sensors can alternately operate as transmitters and receivers with an adjustable alternating current of a constant frequency, and with the receiver having a shorter receiving period than a transmitting period of the transmitter, a device to amplify the receiver signals, convert, form a threshold value and/or determine a phase position of the receiver signal, and store the phase position, and the measuring device (1) is provided with a phase detector circuit (9) and a microprocessor supported evaluation device (12) to correct phase difference values.

* * * * *

UNITED STATES PATENT AND TRADEMARK OFFICE
CERTIFICATE OF CORRECTION

PATENT NO. : 7,520,180 B2  Page 1 of 1
APPLICATION NO. : 12/091193
DATED : April 21, 2009
INVENTOR(S) : Deutscher et al.

It is certified that error appears in the above-identified patent and that said Letters Patent is hereby corrected as shown below:

ON THE TITLE PAGE

At Abstract section, line 9, after the word "at", delete "east" and insert therefor --least--.

IN THE SPECIFICATION

At column 2, line 50, after the word "with", delete "ф" and insert therefor --φ--.

At column 2, line 50, after the word "flow", delete "ф" and insert therefor --φ--.

At column 6, line 41, after the word "with", delete "ф" and insert therefor --φ--.

At column 6, line 42, after the word "or", delete "ф" and insert therefor --φ--.

At column 6, line 50, after the letter "P", delete "(ф)" and insert therefor --(φ)--.

At column 6, line 63, after the letter "P", delete "(ф)" and insert therefor --(φ)--.

At column 7, line 3, after the letter "P", delete "(ф)" and insert therefor --(φ)--.

At column 7, line 61, after the word "an", delete "integrating" and insert therefor --integrated--.

Signed and Sealed this

Twenty-seventh Day of October, 2009

David J. Kappos
*Director of the United States Patent and Trademark Office*